United States Patent [19]

Marcantonio

[11] 4,056,847

[45] Nov. 1, 1977

[54] PRIORITY VECTOR INTERRUPT SYSTEM

[75] Inventor: Angelo Robert Marcantonio, Princeton, N.J.

[73] Assignee: RCA Corporation, New York, N.Y.

[21] Appl. No.: 771,450

[22] Filed: Aug. 4, 1976

[51] Int. Cl.² ............................................. G06F 9/18
[52] U.S. Cl. ................................................. 364/200
[58] Field of Search ...................... 340/172.5; 445/1; 364/200, 900

[56] References Cited

U.S. PATENT DOCUMENTS

| | | | |
|---|---|---|---|
| 3,286,236 | 11/1966 | Logan et al. | 340/172.5 |
| 3,328,771 | 6/1967 | Blaauw et al. | 340/172.5 |
| 3,833,888 | 9/1974 | Stafford et al. | 340/172.5 |
| 3,836,889 | 9/1974 | Kotok et al. | 340/172.5 |
| 3,905,025 | 9/1975 | Davis et al. | 340/172.5 |
| 3,944,985 | 3/1976 | Brandstaetter et al. | 340/172.5 |
| 3,953,835 | 4/1976 | Cuccio et al. | 340/172.5 |

*Primary Examiner*—Mark E. Nusbaum
*Attorney, Agent, or Firm*—H. Christoffersen; Samuel Cohen; Carl M. Wright

[57] ABSTRACT

Vectored priority interrupt system utilizing a priority encoder which provides to the interrupted device, usually a processor, a coded signal denoting the highest priority device requesting an interrupt. The coded signals are transmitted to the interrupted device in response to a distinctive address signal provided by the interrupted device in response to an interrupt signal. Provision is also made to mask and to store the interrupt signals.

1 Claim, 2 Drawing Figures

PRIORITY VECTOR INTERRUPT SYSTEM

BACKGROUND OF THE INVENTION

The invention pertains to the interruption of the normal sequence to instruction execution by a stored program computer in response to external signals.

In the stored program digital computer art, an interrupt is understood to mean a temporary suspension or break in the normal operation of executing sequential instructions so that the processor can service an external device or branch to a predetermined place in the instruction stream in response to an external signal. Peripheral devices providing data storage used in conjunction with the processor operate at speeds which are very slow in comparison to the speed of operation of the processor. Interrupts provide a means for permitting processors to execute instructions while waiting to service the peripheral devices, i.e., to provide data to be written to the device or to accept data read from the device. Another use of interrupts makes programs more versatile and general in application by permitting the operator to indicate which of several alternative branches should be taken in the program depending on some external criteria. This is often accomplished by switches, called break points, which are sensed by the machine using special instructions for that purpose.

There is usually only one interrupt input signal in a processor. When several devices are capable of interrupting, their interrupt request signals are ORed together to provide single processor interrupt signal. Activation of the interrupt signal causes the processor to branch to a subroutine that determines which device caused the interrupt signal to the processor and which service routine or subroutine should be executed. One method of identifying the interrupt is polling where external flag lines are used to identify the device or where each device is interrogated in turn by a special instruction until an active device is found.

A priority interrupt system is used in systems having some devices that must be serviced at a faster rate than others. For example, a high-speed magnetic tape reader must be processed more often than a paper tape reader because the character rate is greater and allowable buffer time is less due to the higher data flow speed. The problem is one of determining not only which device requested an interrupt but also, in the case where several devices request an interrupt, which of the devices has a higher priority and should therefore be serviced first.

A vectored interrupt is an interrupt providing a plurality of responses to the interrupt signal. Sometimes several interrupt lines are provided; in the case of a single interrupt line, a subroutine is used to scan or to poll the possible sources of interrupt and determine from the results which subroutine or program branch is to be executed.

Prior art systems utilizing interrupts require substantial software support which increases the processor time required for vectored interrupts. If priority interrupts are also necessary, more complex software is required and servicing interrupts uses more processor time. In microprocessors, where the instructions are usually more basic than in larger machines, many instructions may be required to perform priority or vectored interrupt servicing, or both. The invention described in this disclosure provides a system for priority vector interrupts requiring few servicing instructions and a minimal external logic circuitry.

BRIEF SUMMARY OF THE INVENTION

A vectored priority interrupt system used with a processor which includes an address bus, a data bus, a memory timing signal, and a memory read signal, and having interrupt request signals provides a decoder responsive to a certain address on the address bus to produce a control signal. A priority encoder is responsive to the interrupt request signals to produce encoded signals representing the highest priority active interrupt signal, and the encoded signals thus produced are coupled to the data bus in response to the control signal and the memory read signal.

DETAILED DESCRIPTION OF THE INVENTION

In the following explanation, a processor interrupt signal is understood to be the signal provided to a processor, i.e., a programmed digital computer or similar device, to indicate that an interrupt is required. Interrupt signals or interrupt request signals are those signals produced by the devices requesting the interrupt, by breakpoint switches, or by other interrupt sources. The preferred embodiment is described as coupled to a COSMAC microprocessor, the details of which can be found in the data sheets for the CDP 1801 or CDP 1802 (RCA Corp.) and in U.S. Pat. No. 3,970,998-assigned to the same assignee as this application. The terms used in this explanation, however, are general enough to be applied to other microprocessor systems by those of ordinary skill in the art.

Figure 1:
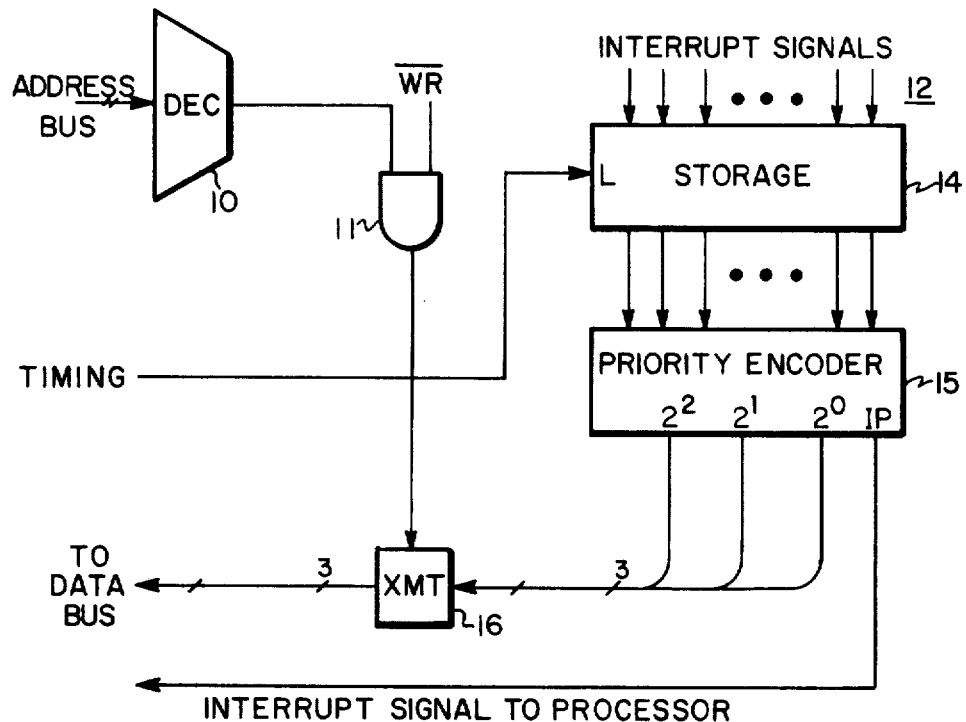
FIG. 1 is a logic diagram of a preferred embodiment of the invention.

In the system of FIG. 1, a decoder 10 is responsive to the address bus signals from a processor and produces an output signal in response to a specific predetermined address. The decoder 10 can be simply a multi-input AND gate having a plurality of inputs equal to the number of lines in the address bus with inverters in the address lines which are logical zeroes in the predetermined address. The output signal from the decoder 10 primes an AND gate 11 which is activated by the read signal from the processor. (The signal $\overline{MWR}$ in COSMAC is a logical zero when a write to memory is to be performed; $\overline{WR}$ is therefore a logical one when a read from memory is to be performed.)

The interrupt lines 12 from the devices that can cause an interrupt are coupled to a storage register 14. The interrupt lines are either active or inactive. If a device requires an interrupt, the line is active; if the device does not require an interrupt, the line is inactive. Active and inactive lines are signified by logical signals of one and zero, respectively. If the interrupting devices provide interrupt signals until serviced, the storage 14 may be eliminated. The storage 14 latches signals on the interrupt lines that are not continuous over several processor cycles. A timing signal from the processor is used to activate the storage 14, to store the state of the interrupt line once per cycle of the processor. In the COSMAC microprocessor, this signal could be the TPA which is produced whenever the address lines contain a valid signal. The storage 14 can be implemented from commercially available circuits such as CD4042 devices (RCA Corporation).

The output signals from the storage 14 are coupled to the input terminals of a priority encoder 15. The output signals from the priority encoder 15 represent a binary value corresponding to the highest priority input signal to the encoder. For purposes of illustration, it is assumed that eight interrupt lines are provided, numbered from zero to seven, with seven having the highest priority. If interrupt line No. 7 is in the active state, the priority encoder output signal will be an octal 7 (binary 111), no matter what other priority lines are active. Similarly, if the interrupt line 7 is inactive but the interrupt line 6 is active, the encoder's output signal will be an octal 6 (binary 110), no matter what other lines lower than 6 are active. If the lowest priority is the only active line, an output of octal 0 (binary 000) is provided. An input present (IP) output signal is provided to differentiate between the octal zero output signal when no input is present and the octal zero output signal when the interrupt line zero is in the active state. The input present signal provides the processor interrupt signal. Priority encoders are easily constructed from individual gates, but a priority encoder device is commercially available; see for example, the CD4532 device (RCA Corporation). In the CD4532 device, the GS (group select) signal is the input present signal. The data sheets for the CD4532 device show how several devices can be cascaded to provide higher level encoding.

The encoded signals from the priority encoder 15 are coupled to one side of an appropriate group of transmission gates 16. Typical transmission gates can be implemented using commercially available integrated circuit devices CD4016 (RCA Corporation). The transmission gates are closed when the AND gate 11 is activated and the output signals from the transmission gates 16 are coupled to the data bus of the processor.

The processor to which the system of the invention is coupled utilizes the encoded signals on its data bus to generate a unique address. The operation begins when an interrupt line is activated. The processor interrupt signal activates the interrupt logic of the processor and the processor reads a specific memory location. That memory location, however, is the system of the invention, which places on the data bus a binary value indicative of the active interrupt device having the highest priority. The information on the data bus can be used directly as an address or by combining the bits on the data bus with fixed higher order bits to generate an address. The output bits from the transmission gates 16 can be coupled to any three lines of the data bus. For instance, if the three bits shown in FIG. 1 are coupled as the $2^7$, $2^6$, and $2^5$ bits, they can be as direct addresses to locations 32 bytes apart. (A byte is eight bits and comprises a memory word in the COSMAC). If the three bits are coupled to the data bus as the $2^6$, $2^5$, and $2^4$ bits, they can be used as direct addresses to locations sixteen bytes apart, and so on.

A typical COSMAC program to utilize the system of the invention will be explained for purposes of illustration. The program is not considered part of the invention and may be performed in a plurality of ways depending on the processor type and use. In the COSMAC, an interrupt signal causes the contents of the P and X- registers (each four bits wide) to be stored in the T-register. The P- and X- registers are then loaded with values one and two, respectively, so that REG. 1 and REG. 2 in the register array stack become the program counter and memory pointer, respectively. It will also be assumed that REG. 1 has been previously loaded with the address of the interrupt routine (hexadecimal 1000) and the REG. 2 has been loaded with the hexadecimal value 1001. REG. 7 has been loaded with FFFF, the address to which the decoder 10 is responsive:

| SAMPLE PROGRAM: COSMAC, CDP 1801 VERSION | | | |
|---|---|---|---|
| MEM. LOC | OP | MNE- MONIC | COMMENTS |
| 1000 | 38 | SKP | Skip next byte. |
| 1001 | — | — | Used for storage of T-register. |
| 1002 | 78 | SAV | Store T reg. at 1001. |
| 1003 | 47 | LDA | Read data from address in REG. 7 to D-register. |
| 1004 | 27 | DEC | Decrement REG. 7 which was automatically incremented by the previous instruction. |
| 1005 | A6 | PLO | Transfer D register contents to lower half of REG. 6. |
| 1006 | D6 | SEP | Use REG. 6 as program counter. |

Setting the P-register to 6 causes REG. 6 in the array stack to be the program counter, thus effecting a program branch to the location in REG. 6, the lower byte of which is the encoded signals from the transmission gates 16. Typically, at the end of the service routine, a RETURN instruction restores the value of the T-register to the P- and X- registers so that the interrupted program continues from the point at which it was interrupted.

Figure 2:
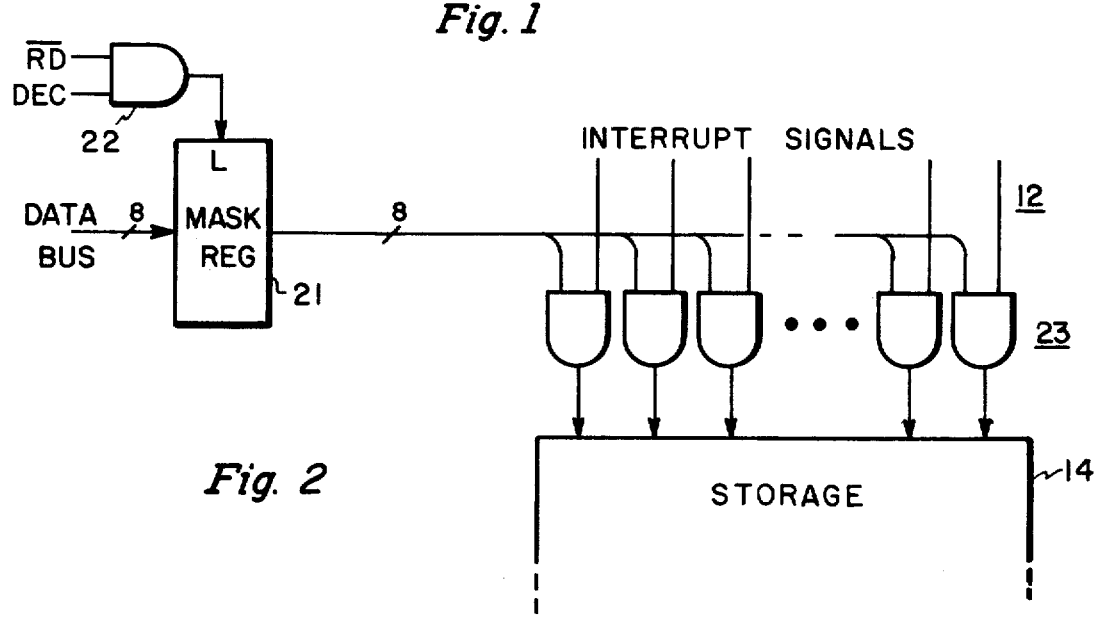
FIG. 2 is a logic diagram of a mask register which can be used in the preferred embodiment.

A mask register can be provided for selectively disabling certain device interrupt lines under program control. In FIG. 2, a mask register 21 is provided to accept the data bus signals when the read signal is not present, i.e., a write signal. (A write signal can be considered to be the absence of a read signal so that a write signal can be generated by inverting the read signal.) The write signal enables an AND gate 22 which is activated by the output of the decoder 10 to activate the latch, or set input, to the mask register 21. The mask register 21 is similar in construction to the storage 14. Each stage in the mask register 21 primes a different one of a set of AND gates 23. The other input to each of the AND gates 23 are the interrupt lines 12. The output signals from the AND gates 23 are coupled to the storage 14. This arrangment permits the programmer to exercise control over the interrupt lines by storing an appropriate byte in the memory location corresponding to the address of the decoder 10. A store instruction in the COSMAC transfers the contents of the D- register to the location addressed by the indicated register from the register stack, i.e., 57 transfers the D- register contents to the address specified by REG. 7 (see above example) which is actually used to activate the decoder 10. The D-register can be set to any desired value by load instructions. If only interrupt lines 7, 6, and 3 are to be enabled, a byte 11001000 (hexadecimal C8) would be loaded in the D-register prior to executing the store instruction. If all interrupt lines are to be enabled, 11111111 (FF) is loaded into the d-register. The remainder of the circuitry operates in the same manner as that described for FIG. 1, like parts having like reference numerals.

Various modifications to the systems and circuits described and illustrated to explain the concepts and modes of practicing the invention can be made by those of ordinary skill in the art within the principles or scope of the invention as expressed in the appended claims.

What is claimed is:

1. In a data processing system capable of handling priority vectored interrupts, said system including means for generating address signals, including address bus means for conducting said address signals, data bus means for conducting data signals, timing signal means for supplying periodic signals, read signal means for supplying signals indicative of system read operations, write signal means for supplying signals representative of system write operations, a plurality of interrupt request signal means for supplying interrupt request signals representative of particular interrupts, each interrupt request signal having an assigned priority, decoder means responsive to said address signals when representative of a particular location for producing a control signal, storage means responsive to said timing signal means for storing the state of each of said plurality of interrupt request signals, priority encoder means responsive to the storage means for producing encoded signals representative of the active interrupt request signal having the highest assigned priority, first gating means responsive to said control signal and said read signal means for coupling said encoded signals to said data bus, the improvement comprising:

second gating means responsive to said control signal and said write signal means for producing a latch signal;

latching means for latching data bus signals in response to said latch signal;

a plurality of third gating means, each responsive to a different one of the latched data bus signals and a different one of said plurality of interrupt request signals, for selectively coupling said interrupt request signals
to said storage means.

* * * * *

UNITED STATES PATENT OFFICE
CERTIFICATE OF CORRECTION

PATENT NO. : 4,056,847
DATED : November 1, 1977
INVENTOR(S) : Angelo Robert Marcantonio It is certified that error appears in the above-identified patent and that said Letters Patent are hereby corrected as shown below:

In the title page, the Application No. should be --711,450--.

Column 1, line 6, "to" should be --of--.

Column 4, line 60, "d-register" should be --D-register--.

Signed and Sealed this

Twenty-first Day of February 1978

[SEAL]

Attest:

RUTH C. MASON
Attesting Officer

LUTRELLE F. PARKER
Acting Commissioner of Patents and Trademarks